A. H. DAVIS.
ATTACHMENT FOR CULTIVATORS.
APPLICATION FILED FEB. 6, 1911.
1,045,126.
Patented Nov. 26, 1912.
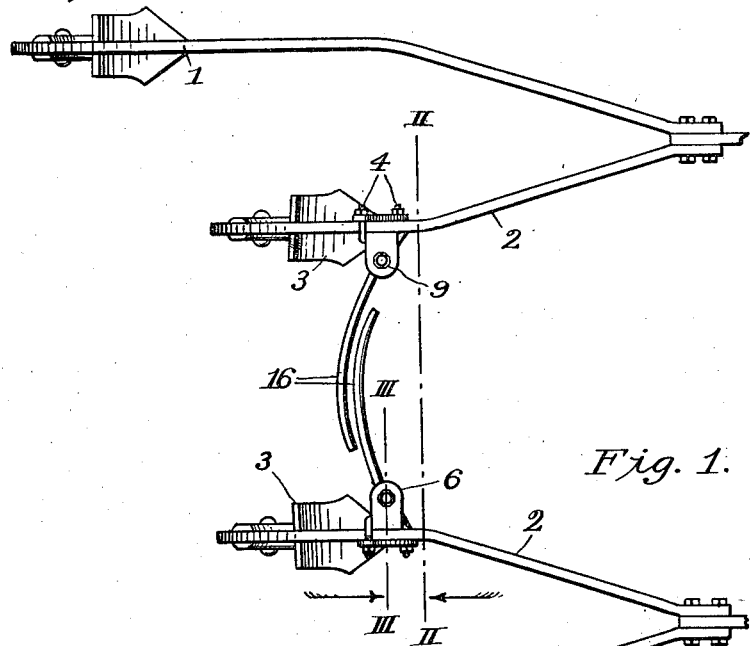
Fig. 1.
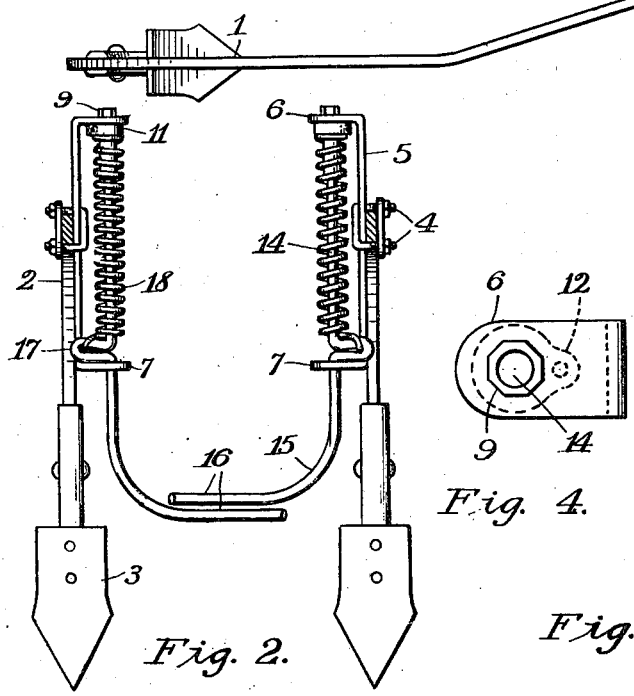
Fig. 2.
Fig. 4.
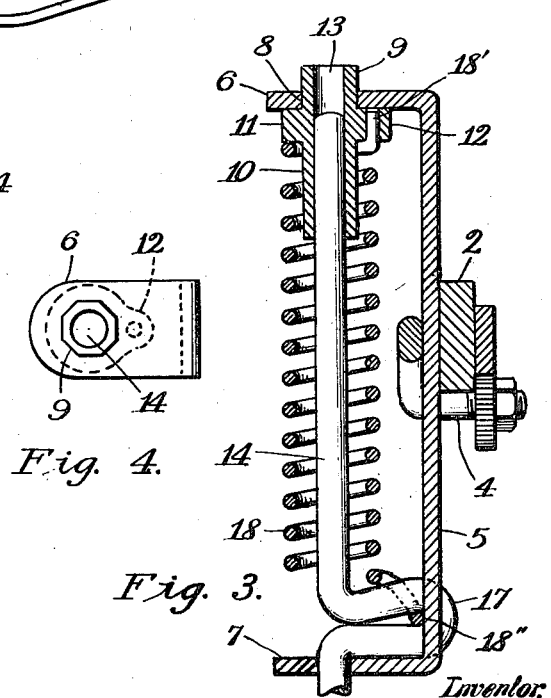
Fig. 3.
Witnesses:
R. Hamilton
A. H. Imboden
Inventor:
A. H. Davis,
By F. G. Fischer,
Atty.

UNITED STATES PATENT OFFICE.

ASAHEL H. DAVIS, OF DOUGLAS COUNTY, KANSAS.

ATTACHMENT FOR CULTIVATORS.

1,045,126.  Specification of Letters Patent.  Patented Nov. 26, 1912.

Application filed February 6, 1911. Serial No. 606,959.

*To all whom it may concern:*

Be it known that I, ASAHEL H. DAVIS, a citizen of the United States, residing in Douglas county, in the State of Kansas, have invented certain new and useful Improvements in Attachments for Cultivators, of which the following is a specification.

This invention relates to attachments for cultivators the object of the invention being to provide an automatically-acting weed-exterminating device whereby the weeds growing between the rows of plants will be covered up by the soil deposited thereon by the cultivating devices.

In order that said invention may be fully understood reference will now be made to the accompanying drawing in which:

Figure 1 is a plan view of that part of a cultivator by which the attachment is carried, showing the attachment in its normal position. Fig. 2 is a front elevation of the attachment, the cultivator being sectioned on line II—II of Fig. 1. Fig. 3 is a sectional detail view, on line III—III of Fig. 1, showing one of the springs and its tension adjustment. Fig. 4 is a top view of the parts shown in Fig. 3.

Referring to Fig. 1, the parts 1 and 2 represent the ordinary beams of a one-row cultivator; 3, the shovels on the inner beams; other parts not connected with the invention are omitted. Secured to the inner face of each of the beams 2, by a U-bolt 4, is a vertical bracket bar 5, having inwardly-projecting lugs 6, 7. The U-bolt is adjustable along the beam, and the bracket bar is vertically adjustable through the U-bolt. In each top lug 6 is a polygonal opening 8, in which is movably fitted a correspondingly shaped boss 9 of a spring-adjusting device. This device consists of a bearing sleeve 10 provided with a flange 11 on which is an eye-lug 12. Rotatable in the bore 13 is the upper end of a rockable shaft 14, which extends through a circular opening in the lower lug 7 and is bent inwardly as at 15, and extended horizontally, as at 16, across the row. Just above the lower lug 7 the shaft 14 is formed with a crank 17. Mounted upon the shaft is a helical spring 18, whose upper end 18′ is inserted in the eye-lug 12 and whose lower end 18″ is engaged with the crank 17 as shown.

As the part 9—10—11 is non-rotatable, the spring presses the crank 17 (which acts as a stop) against the bar 5, thus holding the arm 16 yieldably in the position shown in Fig. 1.

The two arms, 16, may be at the same or different heights, or one may be set in advance of the other. The function of said arms is to bend down the weeds as the implement moves along, so that the soil pushed upon the weeds by the shovels 3 will cover the weeds, thereby killing them.

The springs 18 must be so adjusted that the arms 16 will yield when they strike the stalks of the plant being cultivated. As soon as the arms are free of a stalk the springs return them to normal position. To change the adjustment of a spring, the adjusting device is depressed until its boss 9 is clear of its socket, and is turned in the proper direction, the boss 9 being then replaced in as nearly as possible the same angular position in its opening.

While I have shown and described the preferred construction of my attachment, I of course do not limit myself to the exact combination and arrangement of parts shown, but reserve the right to make such changes as properly fall within the spirit and scope of the appended claims.

Having thus described my invention what I claim, and desire to secure by Letters Patent, is:

1. In combination with the beams of a cultivator, an attachment suitably-secured thereto and comprising a pair of yieldably-mounted transversely-extending arms overlapping at their free ends to bend down weeds growing in a row of plants said arms being movable rearwardly from normal position, and springs coacting with said arms to return them to normal position, said arms being arranged in advance of the cultivating appliances on the beams so that the weeds depressed will be covered with soil by said cultivating appliances, substantially as described.

2. In combination with the beams of a cultivator, an attachment comprising brackets adjustably-mounted on said beams, a vertical rockable shaft mounted in each bracket, an arm on each shaft adapted to extend across a row of plants to bend down weeds growing in said row, said arms being movable rearwardly from normal position, a helical spring mounted on each shaft, and a spring-adjusting device consisting of a bearing-sleeve embracing the upper end of each shaft and having a boss nonrotatably seated in an opening in each bracket, one end of each spring being secured to a sleeve and the other end to a shaft, substantially as shown and described.

In testimony whereof I affix my signature, in the presence of two witnesses.

ASAHEL H. DAVIS.

Witnesses:
 JOHN HEPPNER,
 C. M. ALBRIGHT.